United States Patent
Ghannam et al.

(10) Patent No.: US 10,434,966 B2
(45) Date of Patent: Oct. 8, 2019

(54) GAP BASED AIRBAG DEPLOYMENT

(71) Applicant: Ford Global Technologies, LLC, Dearborn, MI (US)

(72) Inventors: Mahmoud Yousef Ghannam, Canton, MI (US); Darren Lee, Brighton, MI (US); Roy Joseph Scott, Saline, MI (US); Lirjon Llusho, Saint Clair Shores, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 227 days.

(21) Appl. No.: 15/334,820

(22) Filed: Oct. 26, 2016

(65) Prior Publication Data

US 2018/0111575 A1  Apr. 26, 2018

(51) Int. Cl.
| | | |
|---|---|---|
| *B60R 22/00* | (2006.01) | |
| *B60R 21/0136* | (2006.01) | |
| *B60R 21/015* | (2006.01) | |
| *B60R 21/207* | (2006.01) | |
| *B60R 21/01* | (2006.01) | |
| *B60R 21/231* | (2011.01) | |

(52) U.S. Cl.
CPC .... *B60R 21/0136* (2013.01); *B60R 21/01512* (2014.10); *B60R 21/01554* (2014.10); *B60R 21/207* (2013.01); *B60R 2021/01013* (2013.01); *B60R 2021/01286* (2013.01); *B60R 2021/23153* (2013.01)

(58) Field of Classification Search
CPC .......... B60R 21/0136; B60R 21/01512; B60R 21/01554; B60R 21/207; B60R 2021/01013; B60R 2021/01286
USPC ........................... 701/45, 36; 280/729, 729.1
See application file for complete search history.

(56) References Cited

U.S. PATENT DOCUMENTS

| | | | | |
|---|---|---|---|---|
| 5,330,226 A | * | 7/1994 | Gentry | G01V 8/10 280/735 |
| 5,466,001 A | * | 11/1995 | Gotomyo | B60N 2/02 280/730.1 |
| 5,871,232 A | * | 2/1999 | White | B60R 21/01532 280/735 |
| 6,026,340 A | | 2/2000 | Corrado et al. | |
| 6,186,538 B1 | | 2/2001 | Hamada et al. | |

(Continued)

FOREIGN PATENT DOCUMENTS

JP    200688902 A    4/2006

OTHER PUBLICATIONS

"Cadillac's Awesome Safety Secret: Rear-Seat Passenger Sensing System", AskPatty.com Women Blog, Jun. 13, 2014, http://caradvice.askpatty.com/ask_patty_/2014/01/cadillacs-awesome-safety-secret-rear-seat-passenger-sensing-system.html#sthash.iMM1ioUR.WBgRUQ5k . . . (4 pages).

*Primary Examiner* — Khoi H Tran
*Assistant Examiner* — B M M Hannan
(74) *Attorney, Agent, or Firm* — Frank A. MacKenzie; Bejin Bieneman PLC

(57) ABSTRACT

A computer determines a gap distance behind a front seat. In response to detecting an impact of the vehicle, the computer selectively controls deployment of an airbag based at least in part on a gap distance behind the front seat. The computer may determine the gap distance based on seat position data, image data, weight data, triangulation data, and proximity data. The computer may be incorporated into an airbag deployment control system for deploying the airbag behind the front seat.

18 Claims, 7 Drawing Sheets

(56) References Cited

U.S. PATENT DOCUMENTS

| | | | |
|---|---|---|---|
| 6,260,879 B1* | 7/2001 | Stanley | G01G 19/4142 |
| | | | 280/735 |
| 6,507,779 B2 | 1/2003 | Breed et al. | |
| 7,542,836 B1* | 6/2009 | Norton | B60R 21/01532 |
| | | | 280/728.1 |
| 7,887,089 B2 | 2/2011 | Breed et al. | |
| 9,321,423 B2 | 4/2016 | Jaradi et al. | |
| 2002/0029103 A1* | 3/2002 | Breed | B60N 2/002 |
| | | | 701/45 |
| 2005/0218633 A1* | 10/2005 | Levine | B60K 23/02 |
| | | | 280/730.1 |
| 2006/0251293 A1* | 11/2006 | Piirainen | B60N 2/002 |
| | | | 382/104 |
| 2007/0228703 A1* | 10/2007 | Breed | B60N 2/0232 |
| | | | 280/735 |
| 2009/0261979 A1* | 10/2009 | Breed | B60J 10/00 |
| | | | 340/576 |
| 2015/0091280 A1* | 4/2015 | Nagasawa | B60R 21/013 |
| | | | 280/730.1 |
| 2016/0176322 A1* | 6/2016 | Frommann | B60N 2/42709 |
| | | | 701/45 |
| 2017/0036565 A1* | 2/2017 | Ohno | B60N 2/06 |
| 2017/0197574 A1* | 7/2017 | Cooper | B60R 21/01554 |

\* cited by examiner

GAP BASED AIRBAG DEPLOYMENT

BACKGROUND

Vehicles can include a front row of seats and a rear row of seats. The vehicle may include a plurality of airbags that can be selectively deployed for absorbing energy from occupants in response to a sensed vehicle impact. When a vehicle impact is sensed, airbags may be deployed between the front row of seats and the rear row of seats to absorb energy from occupants seated in the rear row of seats. For example, these airbags may be deployed in front of the occupant seated in the rear row of seats for deployment when an impact is sensed that may cause the occupant to move in a vehicle-forward direction, e.g., frontal impact, oblique impacts, etc.

DETAILED DESCRIPTION

Figure 1:
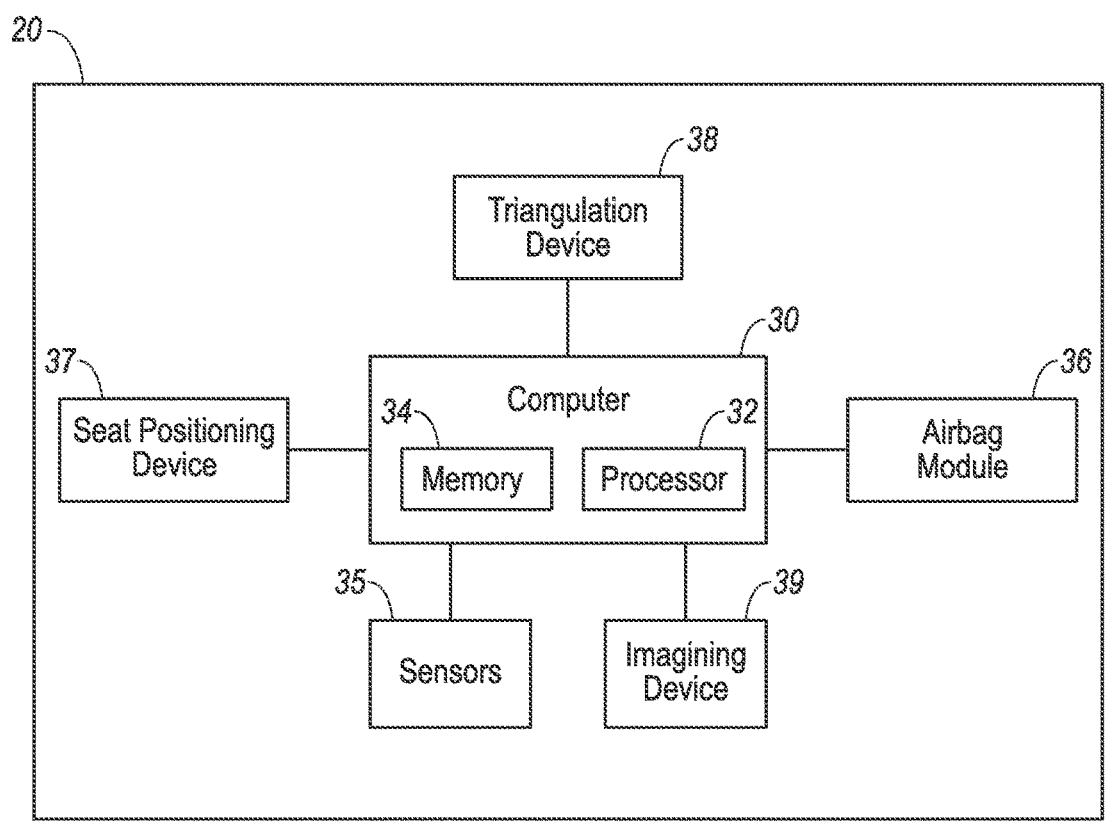
FIG. 1 is a block diagram of components of an example vehicle system.

With reference to the Figures, wherein like numerals indicate like parts throughout the several views, a vehicle system 20 includes an airbag 23 deployable behind a front seat 25 of a vehicle 22. A computer 30 determines a gap distance G behind the front seat 25. In response to detecting an impact of the vehicle 22, the computer 30 selectively controls deployment of the airbag 23 based at least in part on the gap distance G. The computer 30 may determine the gap distance G based on seat position data, image data, weight data, triangulation data, and proximity data. An example of the gap distance G is labeled in FIGS. 2-5.

In the following description, relative orientations and direction (by way of example, top bottom, forward, rearward, front, rear, outboard, inboard, inward, outward, lateral, left, right) are from the perspective of an occupant seated in a driver seat, facing a dashboard of a vehicle. The adjectives "first" and "second" are used throughout this document as identifiers and are not intended to signify importance or order. Similarly, the adjectives "front" and "rear" are intended to identify relative, not absolute position. For example, the front seat 25 may not be in a front-most row of seats in the vehicle 22, and a rear seat 26 may not be in a rear-most row of seats in the vehicle 22. Rather, the front seat 25 is in front of the rear seat 25, regardless of which row the front seat 25 and rear seat 26 are in.

With reference FIGS. 1-5, an exemplary vehicle system 20 for selectively deploying an airbag 23 in an area behind a front seat 25 of a vehicle 22 is shown. The vehicle system 20 includes a computer 30 for selectively deploying the airbag 23. The computer 30 is in communication with one or more sensors 35, e.g., a weight sensor 35w, a proximity sensor 35p, etc., and an airbag module 36. The computer 30 may also be in communication with a seat positioning device 37, a triangulation device 38, and/or an imaging device 39.

With reference to FIG. 1, the computer 30 is a computing device that includes a processor 32 and a memory 34.

The processor 32 is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The processor 32 is programmable to process the data and communications received via a vehicle communication network from the airbag module 36, the memory 34, the sensors 35, the seat positioning device 37, the triangulation device 38, and/or the imaging device 39 to determine a gap distance G behind the front seat 25 of the vehicle 22. The processor 32 is programmable to selectively control deployment of the airbag 23 behind the front seat 25 based at least in part on the gap distance G, and in response to detecting an impact of the vehicle 22.

The memory 34 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 34 may store instruction for performing the processes described herein, and may data collected from sensors 35 and other devices, such as the airbag module 36, the seat positioning device 37, the triangulation device 38, and/or the imaging device 39. For example, the memory 34 may store seat position data, image data, weight data, triangulation data, and proximity data.

The computer 30 is in electronic communication with one or more input devices, e.g. such as are conventional and known (and therefore not shown in the drawings), for providing data to the computer 30 and one or more output devices for receiving data and/or instructions from the computer 30 e.g., to actuate an output device. Exemplary input devices include: human machine interfaces (HMIs) such as a switch or graphical user interface (GUI); imaging devices 39 such as LiDAR, still and/or video cameras, infrared sensors, etc., as well as other sensors and/or electronic control units (ECUs) that are known to provide data, e.g., on a vehicle communications bus or network, such as, radar, ultrasonic sensors, accelerometers, gyroscopes, pressure sensors, thermometers, barometers, altimeters, current sensing devices, voltage sensing devices, microphones, light sensors, etc. etc. Exemplary output that may be actuated by the computer devices include: warning light and audible subsystems; GUIs; HMIs; communication systems 40 having Bluetooth, Wi-Fi or cellular capabilities; other computers; the powertrain system 45, etc.

Figure 2A:
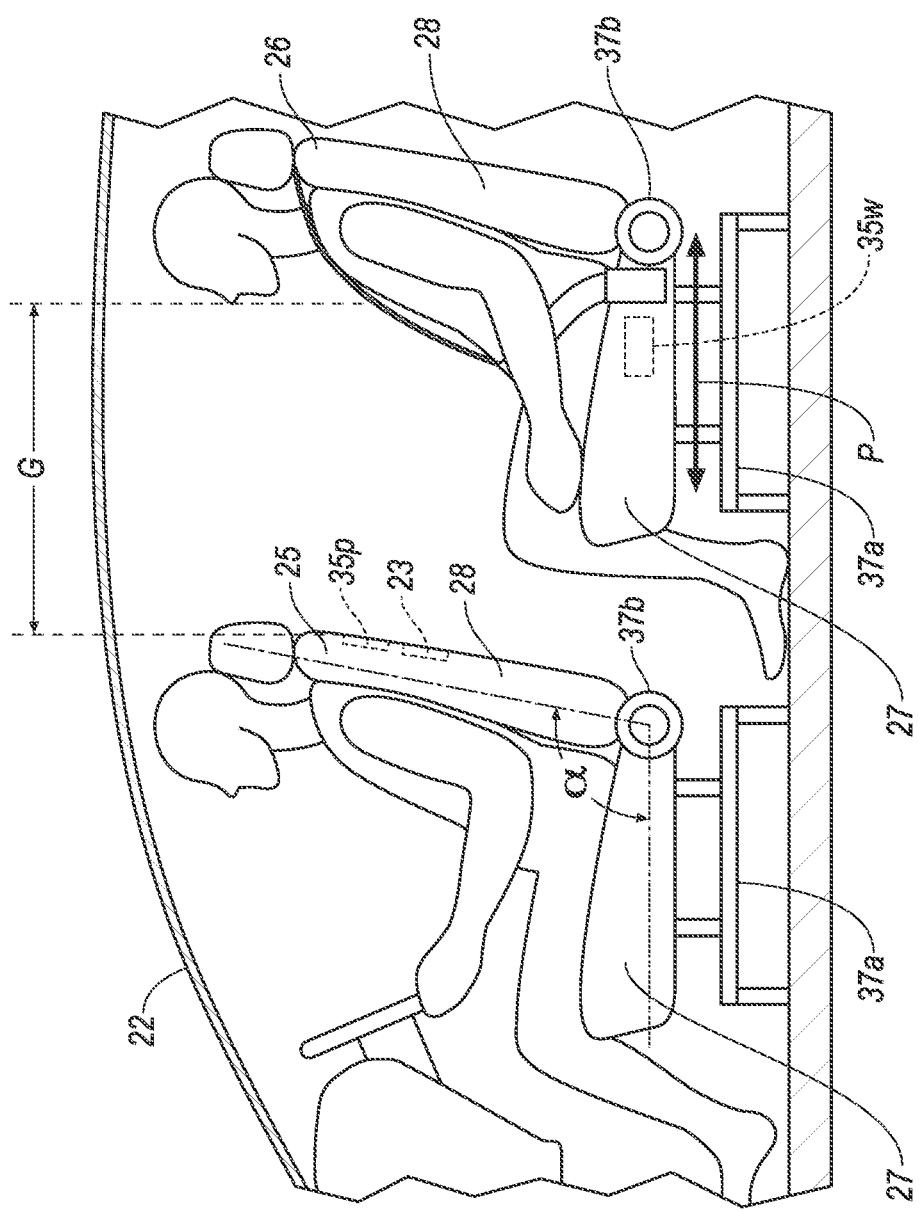
FIG. 2A is a side view of portion of a vehicle including components of an example vehicle system.
Figure 2B:
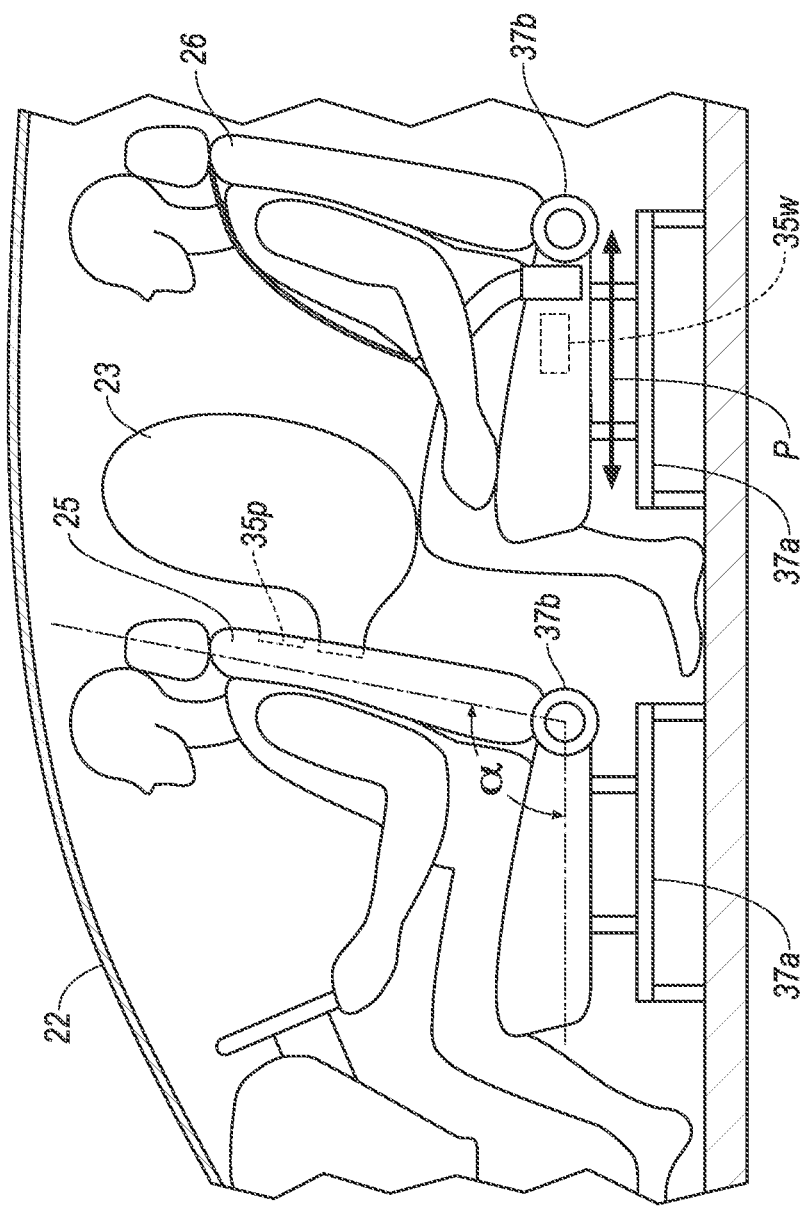
FIG. 2B is a side view of the portion of the vehicle shown in FIG. 2A with an airbag in an inflated position.

The sensors 35 collect and send data to the computer 30. The sensors 35 may detect internal states of the vehicle 22, for example, seat track position and seat back 28 angle for the various seats in the vehicle 22. The sensors 35 may detect the weight of occupants sitting is the various seats of the vehicle 22. For example, a weight sensor 35w may be supported in a base of the rear seat 26. The sensors may detect the relative location of objects, structures, and other sensors 35 within the vehicle 22. For example, a proximity sensor 35p may be supported in the back of the front seat 25, oriented to detect the distance to objects behind the front seat 25, as shown in FIG. 2. The sensors 35 may detect the position or orientation of the vehicle 22, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 35 may detect the external world, for example, radar sensors, scanning laser range finders, impact sensors, light detection and ranging (LIDAR) devices, and image processing sensors such as cameras. The sensors 35 may detect and communicate with each other, for example passive and active radio-frequency identification (RFID) tags, reads, receivers, and antenna.

The airbag module 36 may include a housing, an inflator, and the airbag 23. The housing of the airbag module 36 may be supported by the vehicle 22. The housing may be of any suitable type and construction, e.g., a rigid polymer, a metal, a composite, or a combination of rigid materials. The housing may be configured to house the airbag 23 in an uninflated position, as shown in FIGS. 2A and 3-5, and support the airbag in an inflated position, as shown in FIG. 2A.

The airbag 23 may be formed of any suitable airbag material, for example, a woven polymer. For example, the airbag 23 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The vehicle 22 includes an impact sensing system (not numbered). The impact sensing system includes at least one impact sensor. In the event of an impact, the impact sensor may detect the impact and transmit a signal through the communications network to the computer 30. The computer 30 may transmit a signal through the communications network to the inflator. The inflator may discharge and inflate the airbag 23.

The seat positioning device 37 may include a seat track 37a and a seat recliner 37b for each the front seat 25 and the rear seat 26. The front seat 25 and/or rear seat 26 is supported on the seat track 37a. The front seat 25 and/or rear seat 26 is movable along the seat track 37a in a vehicle 22 longitude direction, e.g. forward or backwards relative to the vehicle 22, between seat track positions P (see FIG. 2). The seat recliner 37b is disposed between a seat base 27 and a seat back 28 of the front seat 25 and/or the rear seat 26. The seat recliner 37b articulates to allow the seat back 28 to pivot relative to the seat base 27 about the seat recliner 37b, altering an angle a between the seat base 27 and the seat back 28 (see FIG. 2). The seat positioning device 37 may include one or more motors, sensors, actuators, controllers etc. to control the position P along the seat track 37a and the angle a of the recliner 37b. Predetermined seat position data, such as track positions P and recliner angles a may be stored as seat memory data on the seat positioning device 37 or the computer 30.

Figure 3:
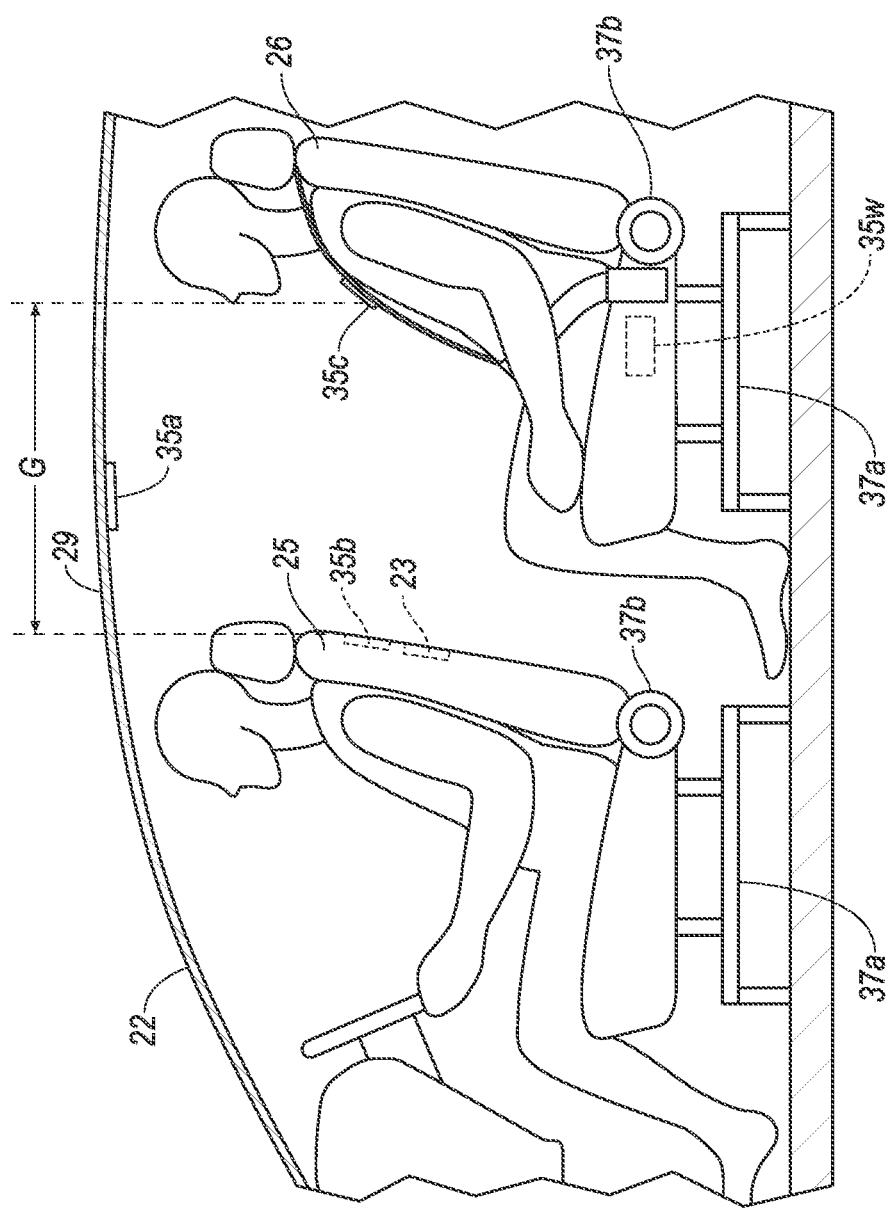
FIG. 3 is a side view of the vehicle including another example vehicle system.

The triangulation device 38 includes a first sensor 35a, a second sensor 35b, and a third sensor 35c, as shown in FIG. 3. The first sensor 35a may be an RFID reader supported on a roof 29 of the vehicle 22. The second sensor 35b and third sensor 35c may be RFID tags, including passive, semi-passive, and active types. The second sensor 35b may be supported in a predetermined location, such as on the front seat 26. The second sensor 35c may be supported in a predetermined location proximate the rear seat 26, such as on a seatbelt of the rear seat 26. The first sensor 35a transmits a signal, which is received and reflected by the second sensor 35b and third sensor 35c. The reflected signal is received by the first sensor 35a.

Figure 4:
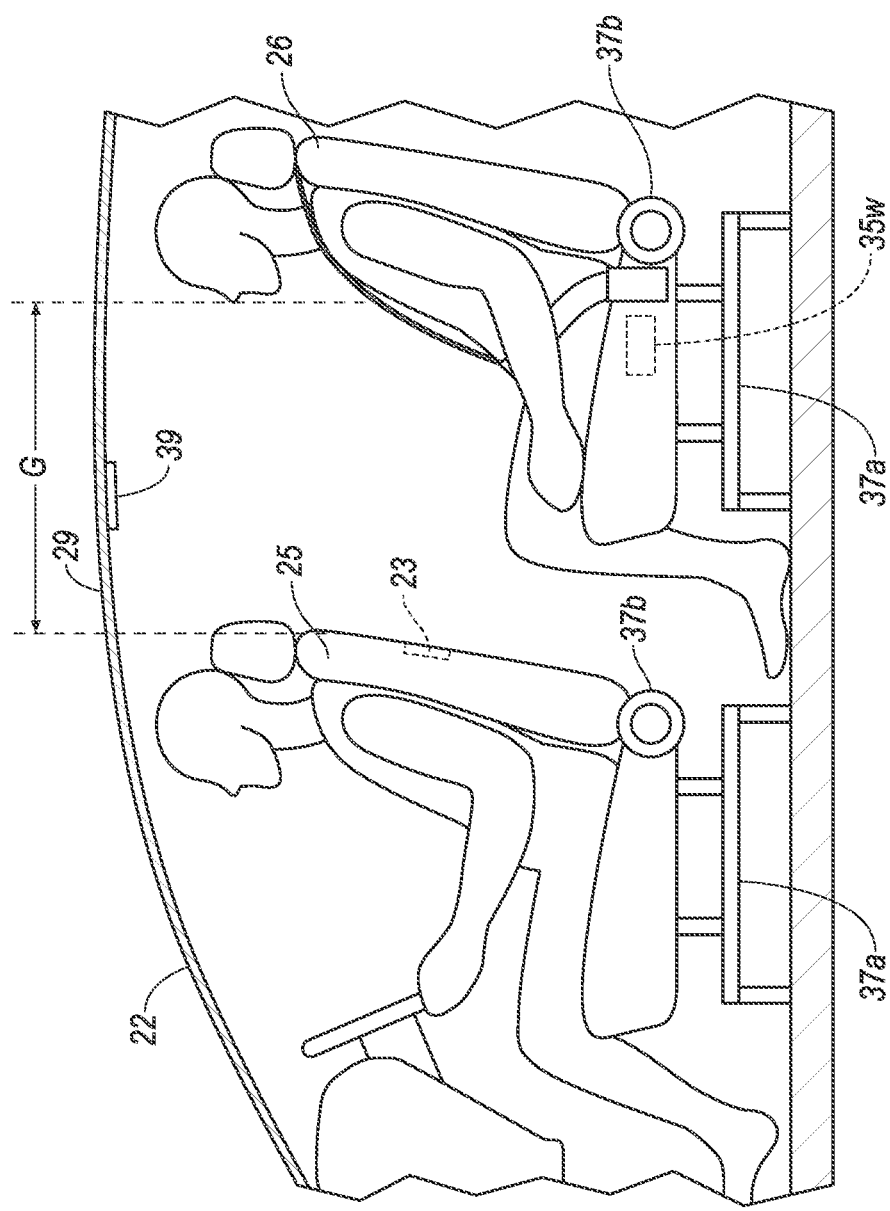
FIG. 4 is a side view of the vehicle including another example vehicle system.

Each of the one or more imaging devices 39 is in electronic communication with the computer 30 in a known manner. Imaging devices 39 can include one or more of a digital (still and/or video) camera, LiDAR, infrared light detector, and/or other sensor. As is known, LIDAR is a technique for transmitting scanned light pulses, which can be from a laser, for example, and measuring the time of flight of the pulses to determine 3D range or distance to points in the surrounding real world. Further as is known, a camera can capture two-dimensional digital images comprised of pixels. In general, the image device 39 captures conventional images in the visible light spectrum, and/or captures images outside of the visual spectrum, for example an infrared image showing detected temperatures. The captured images are converted to electronic data to be transmitted and stored in the memory 34 of the computer 30, e.g., as a file. As shown in FIG. 4, the imaging device 39 may be support on the roof 29 of the vehicle 22. On the roof 29, the imaging device 39 may be oriented to capture a plan view of the front seat 25 and the rear seat 26, such as an image represented by the illustration of FIG. 5.

Figure 6:
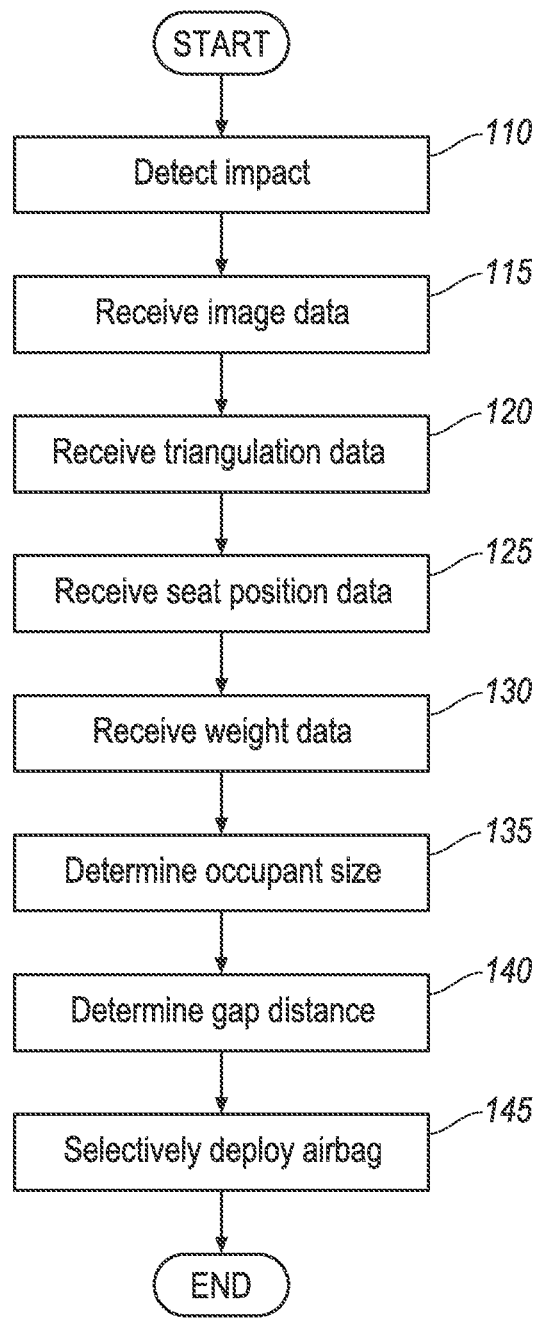
FIG. 6 is a flowchart illustrating a process of selectively deploying the airbag.

With reference to FIG. 6, a process 100 for selectively controlling deployment of an airbag 23 begins when the vehicle 22 is powered on, or otherwise place in a ready state. For example, the computer 30 may be placed in the ready state in response to: a user interacting with the computer 30 with an HMI, such as by turning a key in an ignition or pressing a start button of the vehicle 22; the computer 30 receiving a command from a secondary computer, such as a user's personal computing device; the computer 30 detecting a wireless key fob proximate the vehicle 22; etc.

At block 110, the computer 30 detects an impact of the vehicle 22. The impact may be detected by one or more impact sensors 35 supported on the vehicle 22. The impact sensors 35 measure a force applied on the vehicle 22, such as that created by an object striking the vehicle 22 during a collision event. Additionally, and/or alternatively, the detected impact may be based on sudden changes in the vehicle's motion, such as a sudden change in acceleration or yaw, as measured by the sensors 35.

Figure 5:
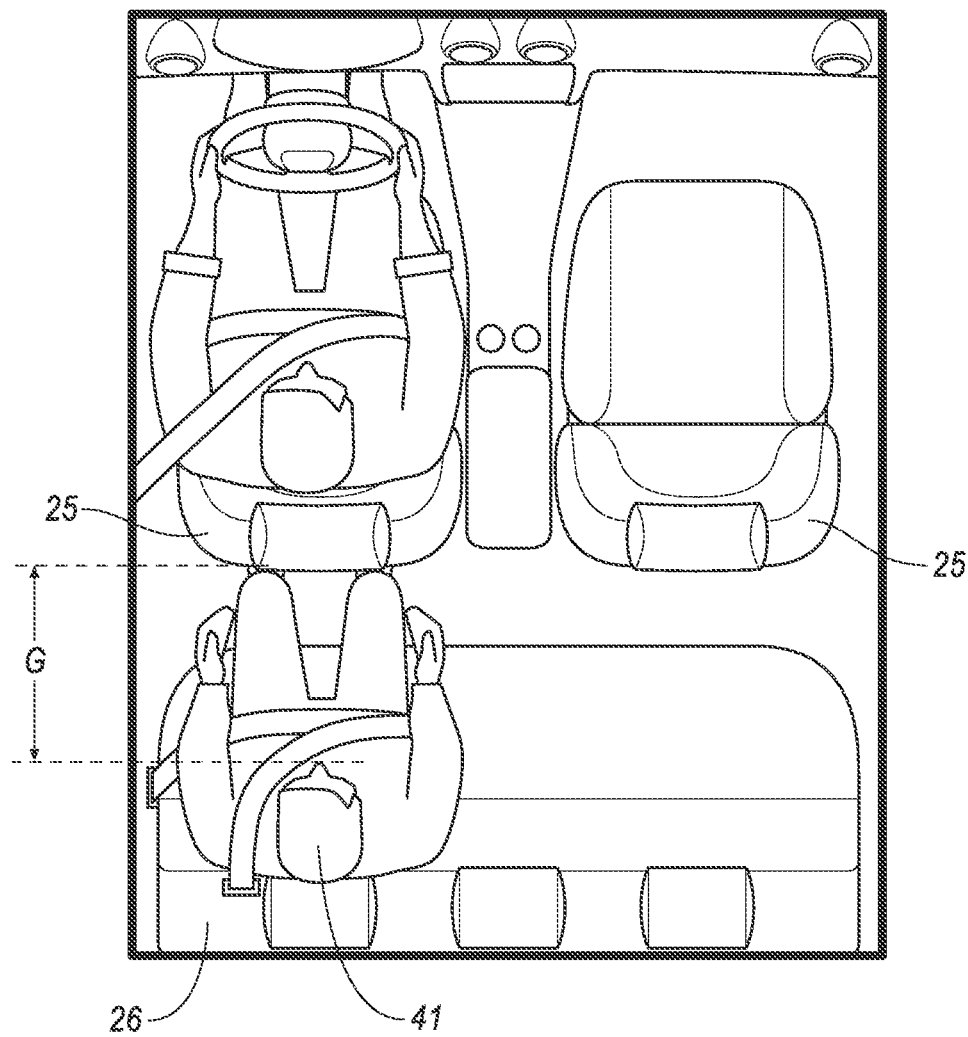
FIG. 5 is a plan view a portion of the vehicle including the example vehicle system of FIG. 4.

At block 115, the computer 30 receives image data. Image data may be generated by the imaging device 39, and provides an electronic picture of a portion of the interior of the vehicle 22. For example, as discussed above, the imaging device may be supported by a roof 29 of the vehicle 22 to capture a top down perspective of the interior of the vehicle 22. For example, the image data may represent an image of the front seats 25 and the rear seats 26, and the occupants seated therein, in a plan view, as illustrated in FIG. 5.

At block 120, the computer 30 receives triangulation data. Triangulation data provides the computer 30 with data related to a spatial relationship of the sensors 35a-c relative to each other. Triangulation data is the data used by the computer 30 and/or the triangulation device 38 to determine the relative locations of the various sensors 35a-c of the triangulation device 38, such as the time between sending and receiving a signal. Triangulation data may be generated by the triangulation device 41. For example, the computer 30 may actuate the triangulation device 41, causing the first sensor 35a, a RFID reader for example, to send one or more signals to the second sensor 35b and third sensor 35c, such as RFID tags. The second sensor 35b and third sensor 35c reflect the signal(s) back to the first sensor 35a. Alternatively, the computer 30 may directly case the first sensor 35a to send out the one or more signals, and to receive the reflected signals. Based on the reflected signal, the triangulation device 41, and/or the computer 30, may determine the time elapsed between sending the signal receiving the signal.

At block 125, the computer receives seat position data. The seat position data may indicate the seat position of the front seat 25 and/or the rear seat 26. The seat position data may include a seat track position P and/or a seat back 28 angle a. The seat position data may be received by the computer 30 from: sensors 35 detecting the position of the seat; the seat positioning device 37; and/or seat memory data stored on the computer 30.

At block 130, the computer 30 receives weight data. The weight data indicates the weight of an occupant occupying the rear seat 26. The weight data may be retrieved by the computer 30 from a weight sensor 35w supported by the rear seat 26, positioned to measure a load applied to the front seat 25 or rear seat 26 by the occupant.

At block 135, the computer 30 determine a size of the occupant. The size of the occupant may be determined based at least on the weight data. The size of the occupant may be broken down into categories based on ranges of weight. For example, range one may include occupants between 0-50 lbs., range two may include occupants from 50-100 lbs., and range three may include occupants above 100 lbs. The three weight ranges described herein are exemplary, and a greater or fewer number of ranges, as well are ranges of different scope, may be used. In another example, determining the size of the occupant may be a binary determination, for example if the occupant is above a threshold weight, i.e. 80 lbs.

At block 140, the computer 30 determines a gap distance G behind the front seat 25. The gap distance G is the available distance behind the front seat 25 in the longitudinal direction of the vehicle 22 for the airbag to deploy. The gap distance G may be determined by measurement and/or estimate by the computer 30, such as by using the techniques described below.

Based on image data, the computer 30 may determine the gap distance G. For example, image data representing the plan view of the interior of the vehicle 22 may be processed to identify various objects and structures, and their respective boundary lines. As one example, the gap distance G is the distance between objects, such as between the front seat 35 and the rear seat 26, or between the front seat 25 and the occupant of the rear seat 26. The objects and structures, and the distance there between may be identified based on the image data captured by the imaging device 39, and processed with the computer 30, such as by using known image processing algorithms.

Based on the triangulation data, the computer 30 may determine a distance between the second sensor 35b and the third sensor 35c to determine the gap distance G. For example, the signals sent by the first sensor 35a, and reflected back with the second sensor 35b and the third sensor 35c, may be used by the computer 30 in combination with time of arrival (TOA) and angle of arrival (AOA) algorithms to determine the distance between the second sensor 35b and the third sensor 35c. The determined distance between the second sensor 35b and the third sensor 35c may be the gap distance G, for example where the second sensor 35b is supported on a predetermined position on the front seat 25, and the third sensor 35c is supported on a predetermined position on the rear seat 26 or on a seatbelt of the rear seat 26.

Based on seat position data, the computer 30 may determine a distance between the front seat 25 and the rear seat 26 to determine the gap distance G. The determination of the distance between the front seat 25 and rear seat 26 may take into account the recliner angle a of the seat back 28 to the seat base 27 for the front seat 25 and/or the rear seat 26 and the seat track position P. In regard to seat position P, the farther forward the front seat 25 is on the seat track, and the farther backward the rear seat 25 on the seat track, the greater the gap distance G. The farther backward the front seat 25 is on the seat track, and the farther forward the rear seat 25 on the seat track, the lesser the gap distance G. In regard to recliner angle, the greater the recliner angle a of the front seat 25, and the smaller the recliner angle a of the rear seat 26, the lesser the gap distance G. The smaller the recliner angle a of the front seat 25, and the greater the recliner angle a of the rear seat 26, the greater the gap distance G.

Based on data received from the proximity sensor 35p supported in the back of the front seat 25, the computer 30 may determine as the gap distance G the distance detected between the proximity sensor 35p and an object identified by the proximity sensor 35p. For example, the proximity sensor 35p may identify and detect the distance to the back of the rear seat 26 behind the front seat 25, or the proximity sensor 35p identify and detect the distance to the occupant of the rear seat 26.

At block 145, the computer 30 selectively controls deployment of the airbag 23 based at least on the gap distance G determined by the computer 30. Selectively deploying the airbag includes determining a level, if any, of deployment of the airbag 23. Higher airbag deployment levels may deploy the airbag 23 with a greater force and/or a greater volume, as compared to lower deployment levels. For example, the greater the gap distance G, the higher the deployment level of the airbag. The smaller the gap distance G, the lower the deployment level of the airbag. For example, when gap distance G is below a first threshold value, the computer 30 may inhibit the airbag 23 from deploying, e.g., may not provide a signal to deploy the airbag 23. When the gap distance G is above the first threshold value and below a second threshold value, the computer 30 may cause the airbag to be deployed at a first level of deployment. When the gap distance G is above the second threshold value, the computer 30 may cause the airbag to deploy at a second level of deployment, with the second level of deployment having a greater deployment force than the first level of deployment. In addition to force, the airbag deployment level may also be related to deployed airbag volume, either through deploying more/less portions of the airbag 23 to make it bigger or smaller, or by deploying additional airbags. Generally, the larger the gap distance G, the larger/more numerous the deployment of the airbag(s). For example, the computer 30 may selectively deploy the airbag 23 by comparing the determined gap distance G to gap distance G ranges and deployment levels in a lookup table stored on the computer 30. An example lookup table is shown below:

| Gap Distance | Deployment Level |
| --- | --- |
| Less than 12 inches | Do not deploy |
| 12 inches to 24 inches | Deploy at level 1 |
| 24 inches to 36 inches | Deploy at level 2 |
| Greater than 36 inches | Deploy at level 3 |

The computer 30 may further selectively deploy the airbag 23 based on the measured weight of the occupant of the rear seat 26, e.g., the weight data. For example, after the deployment level is determined based on the gap distance G, the computer 30 may change the determined deployment level, such as through the use of a lookup table having occupant weight range and related changes. An example lookup table is shown below:

| Occupant Weight | Change in Deployment Level |
| --- | --- |
| Less than 100 lbs. | Do not deploy airbag |
| 100 lbs. to 150 lbs. | −1 to deployment level |
| Greater than 150 lbs. | No change in deployment level |

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 100, one or more of the steps could be omitted, or the steps could be executed in a different order. In other words, the descriptions of systems and/or processes herein are provided for the purpose of illustrating certain embodiments, and should in no way be construed so as to limit the disclosed subject matter, unless such order is explicitly described in the claims.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising programming for:
   determining a distance between a first sensor and a second sensor;
   determining a distance between the first sensor and a third sensor;
   determining a gap distance behind a front seat of a vehicle based on the distance between the first sensor and the second sensor, and based on the distance between the first sensor and the third sensor; and
   selectively controlling deployment of an airbag behind the front seat based at least in part on the gap distance, and in response to detecting an impact of the vehicle.

2. The computer of claim 1, further comprising programming for:
   determining a size of an occupant in a rear seat; and
   selectively controlling deployment of the airbag based at least in part on the size of the occupant.

3. The computer of claim 2, wherein the size of the occupant in the rear seat is determined based at least on data received from a weight sensor.

4. The computer of claim 1, wherein the gap distance is determined based at least on seat memory data.

5. The computer of claim 1, wherein the gap distance is determined based at least on data received from an imaging device.

6. The computer of claim 1, wherein the gap distance behind the front seat of the vehicle is based on seat position data indicating positions of the front seat and a rear seat.

7. The computer of claim 6, wherein the seat position data is based at least on a front seat track position and a front seat recliner angle.

8. The computer of claim 6, wherein the seat position data is based at least on a rear seat recliner angle.

9. A vehicle system comprising:
   a front seat;
   an airbag;
   a computer comprising programming for:
      determining a gap distance behind the front seat of the vehicle; and
      selectively controlling deployment of the airbag behind the front seat based at least in part on the gap distance, and in response to detecting an impact of the vehicle;
   a first sensor in communication with the computer, the first sensor supported on a roof of the vehicle;
   a second sensor in communication with the first sensor, the second sensor supported on the front seat;
   a third sensor in communication with the first sensor, the third sensor located proximate the rear sear; and
   the computer further comprises programming for:
      determining a distance between the second sensor and the third sensor; and
      wherein the gap distance is determined based at least on the distance between the second sensor and the third sensor.

10. The system of claim 9, wherein the gap distance is determined based at least on data received from an imaging device.

11. The system of claim 9, wherein the third sensor is supported on a seat belt of the rear seat.

12. The system of claim 9, wherein the gap distance is determined based at least on seat memory data.

13. The system of claim 12, wherein the seat memory data is based at least on a front seat track position and a front seat recliner angle.

14. The system of claim 9, further comprising:
a proximity sensor in communication with the computer, the proximity sensor supported on the front seat;
wherein the gap distance is determined based at least on data received by the computer from the proximity sensor.

15. A method of deploying an airbag, the method comprising:
determining a gap distance behind a front seat of a vehicle;
selectively controlling deployment of an airbag behind the front seat based at least in part on the gap distance, and in response to detecting an impact of the vehicle;
determining a distance between a first sensor and a second sensor;
determining a distance between the first sensor and a third sensor; and
wherein the gap distance is determined based at least on the distance between the first sensor and the second sensor, and is further determined based in part on the distance between the first sensor and the third sensor.

16. The method of claim 15, further comprising:
receiving seat position data indicating a position of at least one of the front seat or a rear seat; and
determining the gap distance based at least on the seat position data.

17. The method of claim 16, wherein the seat position data is based at least on a front seat track position and a front seat recliner angle.

18. The method of claim 15, further comprising:
determining a size of an occupant in a rear seat; and
selectively controlling deployment of the airbag based at least in part on the size of the occupant.

* * * * *